United States Patent
Schlegel

(10) Patent No.: US 6,994,792 B2
(45) Date of Patent: Feb. 7, 2006

(54) MIXTURES OF ADSORBER MATERIALS

(75) Inventor: Andreas Schlegel, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 5 days.

(21) Appl. No.: 10/384,140

(22) Filed: Mar. 7, 2003

(65) Prior Publication Data

US 2003/0209495 A1 Nov. 13, 2003

(30) Foreign Application Priority Data

Mar. 12, 2002 (DE) .............................. 102 10 786

(51) Int. Cl.
*C02F 1/28* (2006.01)

(52) U.S. Cl. ...................... 210/660; 210/688; 502/406

(58) Field of Classification Search ................ 210/660, 210/688; 502/406
See application file for complete search history.

(56) References Cited

U.S. PATENT DOCUMENTS

| | | | |
|---|---|---|---|
| 4,717,483 A | * | 1/1988 | Bush et al. ................. 210/681 |
| 5,369,072 A | * | 11/1994 | Benjamin et al. ............. 502/84 |
| 6,030,537 A | | 2/2000 | Shaniuk et al. ............. 210/688 |
| 6,093,236 A | | 7/2000 | Klabunde et al. |
| 2002/0053547 A1 | | 5/2002 | Schlegel et al. |
| 2002/0070172 A1 | | 6/2002 | Schlegel et al. |
| 2002/0074292 A1 | | 6/2002 | Schlegel et al. |
| 2002/0077249 A1 | | 6/2002 | Schlegel et al. |

FOREIGN PATENT DOCUMENTS

| | | |
|---|---|---|
| WO | 9950182 | 10/1999 |
| WO | 0189666 | 11/2001 |
| WO | 03043731 | 5/2003 |

OTHER PUBLICATIONS

Patent Abstracts of Japan vol. 014, no. 295 (M-0990), 26. Juni 1990 (Jun. 26, 1990) & JP 093006 A (Nippon Steel Corp), Apr. 3, 1990 *Zusammenfassung*.

Patent Abstracts of Japan, vol. 1996, no. 05, 31. Mai 1996 (Jan. 03, 1996) & JP 08 024634 A (Ishihara Sangyo Kaisha Ltd), 30. Januar 1996 (Jan. 30, 1996) * Zusammenfassung *.

Database WPI Section Ch, Week 200049 Derwent Publications Ltd., London, GB; Class D15, AN 2000-539835 XP002253661 & JP 2000 218109 A (Organo Corp), 8. Auh=gust 2000 (Aug. 8, 2000) *Zusammenfassung*.

* cited by examiner

*Primary Examiner*—Robert A. Hopkins
(74) *Attorney, Agent, or Firm*—Jill Denesvich

(57) ABSTRACT

The present invention relates to mixtures of various adsorption materials, whose adsorption properties supplement one another in the mixture.

14 Claims, No Drawings

MIXTURES OF ADSORBER MATERIALS

BACKGROUND OF THE INVENTION

The present invention relates to mixtures of various adsorption materials whose adsorption properties supplement each other in the mixture.

Contact granules and adsorber granules, including those based on iron oxides and/or iron oxyhydroxides, have already been described. They are used predominantly in continuous processes, where they are usually found in tower- or column-like apparatuses, through which the medium to be treated flows, and on the external and internal surface of the granules of which the chemical or physical reaction or adsorption processes take place.

The flowing media exerts force on the granules, which can lead to abrasion and/or to movement including vigorous agitation of the granules. As a result, the granules collide with one another and in consequence unwanted abrasion results. This leads to loss of contact or adsorber material and to contamination of the medium to be treated.

Iron oxide and iron hydroxide-containing adsorption media/reaction media are advantageously usable, for example, in the field of water purification or gas purification. In water purification, this medium is used in filters or adsorber columns through which flow passes horizontally or vertically, or by addition to the water to be treated, for removing dissolved, suspended or emulsified organic or inorganic phosphorus compounds, arsenic compounds, antimony compounds, sulfur compounds, selenium compounds, tellurium compounds, beryllium compounds and cyano compounds and heavy metal compounds from. Examples thereof can be drinking water, service water, industrial, municipal wastewater, mineral water, holy water and therapeutic water and also garden pond water and agricultural water. It is also possible to use what are termed reactive walls for removing said pollutants from groundwater and leachate water-bearing formations from contaminated sites (landfills).

In gas purification, the medium is used in adsorbers for binding unwanted constituents, such as hydrogen sulphide, mercaptans and prussic acid, and other phosphorus compounds, arsenic compounds, antimony compounds, sulfur compounds, selenium compounds, tellurium compounds and also cyano compounds and heavy metal compounds in exhaust gases. It is also possible to adsorb gases such as HF, HCl, $H_2S$, $SO_x$, $NO_x$.

It is also possible to remove compounds of phosphorus, arsenic, antimony, selenium and tellurium, and also cyano compounds and heavy metal compounds from waste oils and other contaminated organic solvents.

Contact granules and adsorber granules based on iron oxides and/or iron oxyhydroxides are also used to catalyze chemical reactions in the gas phase or in the liquid phase.

Various processes are known to remove the trace substances and pollutants from aqueous systems using adsorption media. Thus DE-A 3 120 891 describes a process in which, to remove principally phosphates from surface water, filtration is performed through activated alumina having a particle size of 1 to 3 mm.

To remove pollutants from water, DE-A 3 800 873 describes an adsorption medium based on porous materials, for example hydrophobized chalk having fine to medium particle size.

DE-A 3 703 169 discloses a process for preparing a granulated filter substance for treating natural water. The adsorbent is prepared by granulating an aqueous suspension of kaolin with addition of pulverulent dolomite in a fluidized bed. The granules are then fired at 900 to 950° C.

DE-A 40 34 417 discloses a process for preparing and using highly reactive reagents for purifying exhaust gas and wastewater. Descriptions are given here of mixtures of $Ca(OH)_x$ with additions of clays, stone flours, fly dust and fly ashes which can be prepared so as to be porous and have a surface area of approximately 200 $m^2/g$.

DE-A 4 214 487 describes a process and a reactor for removing impurities from water. Flow of the water impurities passes horizontally through a funnel-shaped reactor in which the sorbent used for the water impurities is very finely divided iron hydroxide in flock form. A disadvantage of this process is the use of the flock-form iron hydroxide which, owing to the low differences in density between water and iron hydroxide leads to the fact that the reactor for removing the impurities can only be operated at very low flow velocities. Moreover, there is the risk that the sorbent, possibly already loaded with pollutants, is discharged from the reactor together with the water.

JP-A 55 132 633 describes a granulated red mud, a by-product of aluminum production, as adsorbent for arsenic. This is composed of $Fe_2O_3$, $Al_2O_3$ and $SiO_2$. The stability of the granules and the granulation process are not reported therein.

DE-A 19 826 186 describes a process for preparing an iron hydroxide-containing adsorption medium. An aqueous polymer dispersion is mixed into iron hydroxide in water-dispersible form and then dried. As a result a material is obtained in which the iron hydroxide is firmly embedded in the polymer and is said to have a high binding capacity for the pollutants usually present in the wastewater or exhaust gases.

In the publications DE-A 10 047 997 equivalent to PCT/01/10926, DE-A 10 047 996 or PCT/01/10513 adsorber granules based on iron oxides or iron oxyhydroxides are described as having been successfully used, inter alia, for removing arsenic ions and other pollutants from drinking water.

DE-A 10 115 414 or PCT/01/10634 describes, for example, granules based on iron oxide and/or iron oxyhydroxides which comprise as binder Al oxides, Ti oxides and/or Mg oxides. DE-A 10 047 996 or PCT/01/10513 describe the iron oxide or iron oxyhydroxide embedded in an $Fe(OH)_3$ matrix. As a result the granules have an extraordinarily high stability without impairing the arsenic adsorption.

DE-10 047 997 or PCT/01/10926 describes granules from finely particulate or nanoparticulate iron oxides or iron hydroxides having a high specific surface area which, in addition to a high adsorption capacity towards arsenic ions and heavy metal ions, have high strength and abrasion stability when they are used in a fixed bed.

DE-A 10 129 307 or PCT/01/10930 describes various adsorption vessels which can be packed with the above-mentioned granules, which can be used for removing pollutants in water treatment.

DE-A 4 320 003 describes a process for removing dissolved arsenic from ground-water using colloidal or granulated iron hydroxide. For the use of fine, suspended iron(III) hydroxide products, it is recommended here to introduce the iron hydroxide suspension into fixed-bed filters which are packed with granular material or other supports having a high external or internal porosity. This process is also attended by the disadvantage that, based on the adsorbent "substrate+iron hydroxide", only low specific loading capacities are achievable. Furthermore, there is only weak binding between substrate and iron hydroxide, so that in a subsequent treatment with arsenic-containing water, there is the risk of discharge of iron hydroxide or iron arsenate. In this publication, the use of granulated iron hydroxide as adsorber material for a fixed-bed reactor, which is prepared by freeze-drying is additionally mentioned.

The use of granules, which can be produced by compacting, for example, pulverulent iron oxide, by using high linear forces, has already been mentioned. Such granules have been described for homogeneously coloring liquid concrete. The use of high linear forces in compacting is greatly energy intensive and costly and the stability of the compacted material is unsatisfactory for relatively long use in adsorbers. Therefore, such materials are only considered for use with limitations in adsorbers, in particular continuously operated adsorbers, for the purification of water. In particular, during servicing or cleaning the adsorber systems by backwashing (see below), such granules, as a result of the associated agitation of the same, lose large amounts of substance. The backwash water is made highly turbid due to the abrasion. This is unacceptable for several reasons: firstly, adsorber material is lost which, after a long service time, is highly loaded with impurities and is therefore a toxicological hazard. The wastewater stream is then polluted with the abrasion which can sediment and thus lead to impairment of the piping systems, and finally the sewage treatment plant is undesirably physically and toxicologically polluted, to name just a few reasons.

For water treatment, preferably, continuously operated adsorbers are used, which are frequently operated in groups arranged in parallel. At peak consumption times, the adsorbers present are then operated in parallel in order to prevent the flow velocity from increasing above the design-limit maximum. During times of lower water consumption, individual adsorbers, for example, the adsorber material being exposed to particular stresses, as are described in more detail below are taken out of operation and can then be serviced.

In water treatment, preferably continuously operated adsorbers are used which are frequently operated in groups arranged in parallel. To remove organic pollutants from water, such adsorbers are charged, for example, with activated carbon in granulated or pulverulent form.

Ion exchange resins or zeolites are used, inter alia, for water softening and for removing numerous cations and anions.

Activated alumina in various particle sizes is principally used for removing fluorides and arsenic compounds.

Frequently there is encountered the problem of having to remove a plurality of constituents of different types simultaneously from one and the same water source. Usually this is performed sequentially by a plurality of series-connected adsorption columns.

An object underlying the present invention was therefore to mix highly reactive reagents and compositions based on, in particular, dry, pulverulent or granulated mixtures of iron oxides, iron (oxy)hydroxides and other adsorption media/reaction media, with or without additives, for example binders, for purifying waters. The purifying water can be from the group of drinking water, service water, mineral water, garden pond water, agricultural water, holy water and therapeutic water and/or gases which contain pollutants. The reagents and compositions are distinguished by high purification performance and landfill safety of the products, and processes for their production and their use. The mixture of the adsorption media/reaction media should ensure a high combined binding capacity and as a result high removal of the pollutants present or dissolved in liquids and gases, but which, at the same time, should withstand the mechanical and hydraulic stresses in the adsorber housings or systems. In addition, for safety, and for the filtration performance of installed filters, it should prevent the discharge of suspended impurities or abraded adsorber parts which are possibly loaded with pollutants.

Filter cartridges for purifying liquids, preferably contaminated water, which can also contain an adsorption medium, are known in various embodiments. To remove solids from waters, membrane filter candles, for example, in suitable housings are used. The company Brita Wasser-Filter-Systeme GmbH has disclosed cartridges and apparatuses for treating liquids (DE-A 19 905 601; DE-A 19 915 829; DE-A 19 814 008, DE-A 19 615 102, DE-A 4 304 536, U.S. Pat. No. 6,099,728). These apparatuses are highly suitable for the complete or partial desalination of drinking water in domestic jugs immediately before use of the drinking water.

U.S. Pat. No. 4,064,876 discloses a filtration unit constructed as a filter cartridge which has a bed of activated carbon particles between a polyester urethane foam layer and a glass fiber layer.

DE-A 19 816 871 (Sartorius) describes a filtration unit for removing pollutants from fluids.

RU-A 2 027 676 describes a cartridge filter having a sorbent for drinking water purification having a connection to the water tap in the residence.

HU-A 00 209 500 describes a filter cartridge for removing radioactive material and heavy metals from water which is packed with a mixture of ion-exchange material, activated carbon, filter sand, zeolites, aluminum oxide and red mud.

Usually these adsorber cartridges are packed with activated carbon or ion-exchange resins. However, activated carbon has the disadvantage that arsenic salts and heavy metal salts, as they occur in aqueous systems, are not removed to a sufficient extent because of the low adsorption capacity of the activated carbon, and this affects the service life of the cartridges.

This object is achieved by a filtration unit which consists of a housing made of plastic, wood, glass, ceramic, metal or a composite material which is provided with inlet and outlet orifices. Exemplary simple embodiments are described extensively in DE-A 19 816 871. An improved embodiment of an adsorber tank is described in DE-A 10 129 307 or PCT/01/10930. In principle, obviously, other embodiments and designs are possible which resemble the described structures and which operate in the manners described, that is to say comprise an inlet and outlet orifice for waters and iron oxide and/or iron (oxy)hydroxide as adsorber media. The housing space here can be completely or partly filled with the adsorber particles. By packing the housing space with a bed of adsorber particles which takes up between 1 and 99% of the housing volume, a high flow rate of the fluid to be purified is ensured. For, as a result of the stability of the adsorber granules, the influent liquid is opposed by low resistance.

These publications also describe a filter bag which, filled with adsorber granules, can be supplied to a body of water to be purified in order to remove the pollutants present therein by adsorption.

Filter bags and extraction envelopes are known, for example, in many forms and embodiments for preparing hot infused beverages, in particular tea. DE-C 839 405 describes, for example, such a folded bag as used for preparing tea and the like. By means of a special folding technique which forms a double-chamber system, intensive mixing of the eluent with the substance to be extracted is ensured.

The inventive contacts and adsorption media/reaction media, their provision, their use and apparatuses charged with these achieve this complex object. The invention further relates to a process for synthesizing the adsorbers for packing into the inventive filtration units.

SUMMARY OF THE INVENTION

Surprisingly, it has now been found that the mixtures of various adsorption media in granular or pulverulent form supplement each other in their adsorption capacities and do not mutually oppose each other, as perhaps could have been expected. For example, activated carbon, activated alumina, granulated iron (oxy)hydroxide or ion exchange resins mix with one another in virtually any ratio.

Other substances which have a water-purifying activity can also be admixed. Manganese oxide, for example, which is known to have the oxidizing activity towards arsenic(III) compounds: W. Driehaus, Fortschr.-Ber. VDI, 15; 133, VDI Düsseldorf, 1994 can be admixed. Adding this substance has, for example, the advantage that As(III) compounds can also be removed in addition to As(V). Copper compounds and/or zinc compounds and/or silver compounds can also be admixed. It is known that these compounds, for example in water, can have a biocidal activity towards harmful microorganisms.

Accordingly, the invention encompasses a process for producing highly reactive reagents for purifying water which is polluted by organic, inorganic or biological pollutants or constituents, comprising providing mixtures of various adsorber media, whose adsorption properties supplement one another in the mixture. Also encompassed by the invention is a process for gas purification comprising treating the same with the adsorber mixture of the invention.

The suitable mixing ratios of the adsorbents can be chosen by the one skilled in the art, depending on the available water quality, taking into account the necessary purity requirements. The mixtures prepared in this manner can be adapted to the particular requirements of water purification.

The mixtures can be sold in bulk as a composition, or can be packaged in adsorber containers (and then sold).

The mixtures of the individual adsorption media can be prepared by mixing the individual adsorbers, each in their pulverulent, granular or other commercial usage form or mixtures thereof, with or without binder and/or water, shaping via an extrusion press, an extruder or other pelleting and granulating apparatuses to form bodies, rods or granules, or pressing them via a pressing apparatus with or without binders to give shaped bodies in a suitable size. The mixtures of the individual components can also be prepared by admixing or mixing other adsorption media, for example during the production process. For example, during the synthesis of granulated iron oxide/(oxy)hydroxide, as described, for example, in DE-A 10 047 997 equivalent to PCT/01/10926, adsorber materials in pulverulent or granular form can be admixed with the subject suspension, the filter paste during paste formation or after granulation in such a manner that a stable composite material is formed which remains highly coherent during its use in adsorber columns, and in such a manner that the adsorption capacity of each individual component is retained.

The inventive mixtures can be embedded in an adsorption container through which a liquid to be treated can flow, in particular a filter adsorption container which is packed with granulated or pulverulent solid, water-insoluble adsorption media for removing organic, inorganic or biological trace materials and pollutants from drinking water. The apparatus can be connected, for example, in the home, to the sanitary and drinking water supply.

DETAILED DESCRIPTION OF THE INVENTION

Particularly preferably, the inventive granules are used in the purification of liquids, in particular for removing heavy metals. A preferred application in this technical field is decontaminating water, in particular drinking water. Most recently, the removal of arsenic from drinking water has received particular attention. The inventive granules are outstandingly suitable for this purpose, since the concentrations achieved by using the inventive granules may not only comply with, but even fall below, the low limit values established by the US Environmental Protection Agency (EPA). Frequently there is encountered the problem of not having a suitable drinking-water treatment plant in the vicinity, or not having a suitable system which would continuously remove pollutants, especially in regions where well water, mains water or drinking water in general is contaminated with arsenic or other heavy metals.

The inventive adsorber mixtures in pulverulent, fine-granulated or coarse-granulated form may also be embedded into semipermeable bags having a filtering action (for example the above-described folding bag).These packages may be provided for the waters to be purified by contacting the water therewith, and after a certain contact time, removing the pollutants from the waters by adsorption to the adsorber material. In accordance with the invention, firstly, the adsorber mixtures withstand the mechanical and hydraulic stresses in the filter bag, and secondly, owing to the filter action of the filter membrane, exit of any fine material of the adsorption medium produced by abrasion into the waters to be purified is prevented.

The various embodiments of the present invention share the fact that mixtures of various adsorbents in fine-granulated, coarse-granulated or pulverulent or pressed form are embedded in housings having a filtering action and the liquid to be purified is allowed to flow through the filter housing or the filter packing is supplied to the liquid to be purified and thus ensures adsorption of the pollutants.

For preparation of the inventive granules, reference is made to DE-A 10 047 997 equivalent to PCT/01/10926, DE-A 10 047 996 or PCT/01/10513, DE-A 10 129 307 or PCT/01/10930 and DE-A 10 115 414 or PCT/10/10634 and the literature cited in these publications.

Mixtures of the various adsorbers can be prepared as follows, for example. As described in Example 1 hereinbelow, a suspension of iron (oxy)hydroxides is prepared and various adsorber materials are added in a certain ratio, the suspension is filtered and the residue is washed essentially salt-free. The filter cake which is obtained as residue is a solid to semisolid paste. This can then be completely or partially dewatered and the resultant material can then be comminuted into the desired shape and/or size. Alternatively, the paste or the filter cake, if appropriate after predrying to achieve a sufficiently solid state, can be subjected to shaping and subsequent (further) drying to achieve a particulate state. The later use of the granules determines the preferred procedure in their production and can be determined by those skilled in the art for the respective field of application by simple guideline preliminary experiments. Not only the immediately dried filter cake but also the dried shaped bodies can then be used as contact or adsorber.

The finely divided iron oxide and/or iron oxyhydroxide used typically has a particle size of up to 500 nm, preferably up to 100 nm, particularly preferably 4 to 50 nm, and a BET surface area of 50 to 500 m$^2$/g, preferably 80 to 200 m$^2$/g.

Alternatively thereto, the products obtainable according to Example 1 or Example 2 or mixtures can then be further comminuted, for example, by coarse grinding or grinding.

Another method of producing granules which has proven itself in practice is pelletizing a semi-moist paste. In this process pellets or rods are formed from a semisolid paste, for example, by means of a simple perforated plate, a roller press or an extruder, and this is either dried straightaway or the extrudates are additionally brought into a spherical or granular form by means of a spheronizer. The still-moist beads or granules can subsequently be dried to a desired moisture content. In order that the granules do not clump together, a residual moisture content of <50% is advisable. Such a spherical form can be advantageous for the use in fixed-bed adsorbers because of the improved bed in the adsorber container compared with shredded granules or pellets in rod form.

In general it is possible, for improving the filtration behavior of the suspensions, to employ customary measures enhancing filtration, such as are described, for example, in Solid-Liquid Filtration and Separation Technology, A. Rushton, A. S. Ward, R. G. Holdich, 2nd edition 2000, Wiley-VCH, Weinheim, and Handbuch der Industriellen Fest/Flüssig-Filtration [Handbook of industrial solid/liquid filtration], H. Gasper, D. Öchsle, E. Pongratz, 2nd edition 2000, Wiley-VCH Weinheim. Thus, for example, flocculants can be added to the suspensions.

In addition to, or in place of, the iron oxyhydroxides, iron carbonates can also be used.

The inventive products can be subjected to drying in air and/or in vacuo, and/or in a drying cabinet and/or on belt dryers or by spray-drying, preferably at temperatures of –25 to 250° C., particularly preferably at 60 to 120° C.

The inventive products preferably have a residual water content of less than 20% by weight.

It has been found that the resultant pieces or granules have a high binding capacity for pollutants present in waters, liquids or gases, and, in addition, they have a sufficiently high stability with respect to mechanical or hydraulic stress due to flowing media.

In particular, it is surprising that finely divided iron oxyhydroxides or iron oxides having high specific surface areas solidify on mixing with a different type of adsorption medium and additives after the drying into very hard agglomerates which have, without addition of binder, a high mechanical abrasion strength and high hydraulic stability with respect to contact with flowing water, and which have a high binding capacity for the pollutants and trace substances present in the water.

For the inventive use of finely divided iron oxyhydroxides, for example, transparent iron oxyhydroxide pigments having specific surface areas of greater than 80 m$^2$ are suitable. However, correspondingly finely divided iron oxide pigments can also be used, preferably haematites, magnetites or maghaemites.

The production of yellow finely divided iron oxyhydroxide pigments (for example goethite) in the acidic or alkaline pH range, using what are termed acidic or alkaline seeds, is found in prior art including numerous patents.

Iron oxyhydroxides of the most varied phases each in pure form or in any mixture are prepared by the known precipitation and oxidation reactions from iron(II) salt solutions or iron(III) salt solutions. The resultant iron oxyhydroxides, if appropriate after a post-treatment and admixing other adsorber media, are separated off from the suspension by filtration from the salt solution and washed substantially salt-free, preferably up to a residual conductivity of <5 mS/cm. The resulting solid or semisolid filter cake is subjected as it is, or if appropriate after a mechanical shaping, to drying to achieve a solid state, and a high mechanical strength material is obtained which has a high binding capacity for the pollutants usually present in wastewater or exhaust gases.

The drying is expediently performed at temperatures up to 250° C. Vacuum-drying or freeze-drying of the material is also possible. At all events, however, the drying temperature should be selected such that none of the individual adsorption media loses its own adsorption capacity. The particle size of the material is arbitrary; it is preferably between 0.2 and 40 mm, particularly preferably between 0.2 and 20 mm. This can be achieved by mechanical shaping of the semisolid pasty filter cake before drying by a granulation or pelletizing system or in an extrusion press to give shaped bodies having a size in the range from 0.2 to 20 mm, and subsequent drying in air, on a belt dryer or in a drying cabinet, and/or by mechanical comminution to the desired particle size after drying.

Compared with the prior art, the products described, the process for their production and their use are an improvement. The inventive granule mixtures based on finely divided iron (oxy)hydroxides and/or iron oxides can be used in a considerably more space-saving manner with an adsorber mixture which is individually adapted to defined purification requirements in adsorber columns and a plurality of columns each having different media are not required. They can be used directly as such.

A separate granulation, as would be necessary when conventional iron oxyhydroxides are used in the form of (flowable) powder, either with the aid of foreign binders or very high linear forces in compacting, can be dispensed with completely.

According to the invention, the suspensions of the finely divided iron oxyhydroxides or iron oxides can also be admixed with conventional pulverulent iron oxyhydroxides or iron oxides. The respective amounts are determined by the properties of these pulverulent iron oxyhydroxides or iron oxides and the requirements made of the inventive product with respect to its mechanical stability and abrasion strength. Although the addition of pulverulent pigments will generally decrease the mechanical strength of the inventive products, filtration of the finely divided suspensions is facilitated. Those skilled in the art in the respective field of application will be able to determine by means of a few preliminary experiments the optimum mixing ratio for the respective use.

The mixtures of the adsorption media can also be additionally admixed with an amount corresponding to the NaOH excess of aqueous salts of $Fe^{3+}$, $Al^{3+}$, $Mg^{2+}$, $Ti^{4+}$ or mixtures thereof so that sufficiently slightly soluble precipitates of $Fe(OH)_3$, $Al(OH)_3$, $Mg(OH)_2$, $TiO(OH)_2$, or products of aging and secondary dehydrated products thereof precipitate onto the suspended iron oxide particles and/or iron (oxy)hydroxide particles. Vice versa, the slightly soluble precipitates $Fe(OH)_3$, $Al(OH)_3$, $Mg(OH)_2$, $TiO(OH)_2$ or their products of aging and secondary products can be precipitated onto the iron oxide or iron (oxy)hydroxide particles suspended in $Fe^{3+}$, $Al^{3+}$, $Mg^{2+}$, $Ti^{4+}$ solutions by adding alkalis, for example NaOH, $Ca(OH)_2$, KOH, $CaCO_3$, $Na_2CO_3$, $K_2CO_3$, $NH_4OH$. The aluminum oxide or aluminum (oxy)hydroxide can also be precipitated from an aluminate suspension (for example NaAlO$_2$) onto the iron oxide particles and/or iron (oxy)hydroxide particles.

For this purpose the granules can be used in customary adsorber apparatuses as are currently used, for example charged with activated carbon, for removing other types of pollutants. A batchwise operation, for example, 9 in cisterns or similar containers, which may be equipped with stirrers, is also possible. However, use in continuous systems, such as continuous-flow adsorbers, is preferred.

As a result of the inventive stability of the granules and owing to suitable packing of the adsorber granules, material abrasion is minimized.

Therefore, water treatment plants or waterworks in which apparatuses charged with the inventive granules are operated are also subject-matter of the present invention, as are processes for decontaminating water using such apparatuses, and apparatuses of this type themselves.

The specific surface area of the inventive products is determined in accordance with BET via the carrier gas method (He:N$_2$=90:10) using the one point method as specified by DIN 66131 (1993). Before measurement, the sample is heated for 1 h at 140° C. in a stream of dry nitrogen.

To measure the adsorption of arsenic(III) and arsenic(V), 31 g of an aqueous solution of NaAsO$_2$ or Na$_2$HAsO$_4$ having a concentration in each case of approximately 2–3 mg/l of arsenic is treated with 3 g of the sample under test in a 5 l PE flask over a defined period, and the flask is agitated in the course of this on rotating rollers. The adsorption rate of As ions on iron hydroxide over this defined period, for example one hour, is reported as mg(As$^{3+/5+}$)/g(FeOOH)·h from the difference from the As$^{3+/5+}$ ions remaining in solution.

The As contents of the loaded iron oxyhydroxide or of the solutions is determined using mass spectrometry (ICP-MS) as specified in DIN 38406-29 (1999) or via optical emission spectroscopy (ICP-OES) as specified by EN-ISO 11885 (1998), in each case using inductively coupled plasma as the excitation unit.

Mechanical and hydraulic abrasion strength was evaluated according to the following method: 10 g of the granules under test having particle sizes >0.1 mm were admixed with 150 ml of deionized water in a 500 ml conical flask and rotated at 250 rotations/minute for a period of 30 minutes in a LabShaker shaking machine (Kühner model, from Braun). The fraction >0.1 mm was then isolated from the suspension using a screen, dried and weighed. The weight ratio between final weight and initial weight gives the abrasion value in %.

The invention will now be described in more detail below with reference to examples. The examples are intended to illustrate the process and do not represent a limitation.

EXAMPLES

Exemplary Embodiment 1

3 100 kg of NaOH were charged and diluted with cold water to 31 m$^3$ (as solution containing approximately 100 g/l). The temperature of this NaOH solution was 24° C.

3 800 kg of FeSO$_4$ are dissolved with water to give 36 m$^3$ of solution, cooled to 13–14° C. and then pumped with stirring to the NaOH charge in the course of 40 min. The resultant suspension was then oxidized in the course of 90 min with 2,500 m$^3$/h of air with stirring.

Then, 17.4 m$^3$ of an FeSO$_4$ solution (100 g/l) are added at 150 l/min with aeration at 1,300 m$^3$/h of air, with stirring.

The seed suspension was washed on a filter press to a filtrate conductivity <1 mS/cm, the filter paste was forced through a perforated plate and dried on a belt dryer to a residual moisture of <20% by weight. The material thus dried was coarsely ground to particle sizes <2 mm. The fines fraction <0.5 mm was removed via a screen. The resultant material had a specific BET surface area of 134 m$^2$/g and consisted of 100% α-FeOOH. The abrasion value after 30 minutes was only 4.0% by weight.

The adsorption rate with respect to an aqueous Na$_2$HAsO$_4$ solution of a starting concentration of 2.7 mg/l (As$^{5+}$) was 0.7 mg of (As$^{5+}$)/g(FeOOH)·h.

Exemplary Embodiment 2

A suspension of iron (oxy)hydroxides prepared according to Example 1 is admixed with 10% by weight of Lewatit® iron exchanger from Bayer AG, 20% by weight of activated carbon and 20% by weight of activated aluminum oxide. The percentages by weight are based on 100% total dry granule weight. The suspension is washed on a filter press to a filtrate conductivity <1 mS/cm, the filter paste is forced through a perforated plate and dried on a belt dryer to a residual moisture of <20% by weight. The material thus dried was coarsely ground to particle sizes <2 mm. The fines fraction <0.5 mm was removed via a screen. The resultant material was used directly in an adsorber tank.

Exemplary Embodiment 3

The dry iron (oxy)hydroxide granules prepared according to exemplary embodiment 1 are admixed with 20% by weight of a cation exchanger, 30% of a granulated activated carbon (particle sizes between 0.5 and 2 mm) and 20% granulated aluminum oxide and compacted under the action of high linear forces. The resultant admixture (compactates) are coarsely ground to particle sizes between 0.5 and 2 mm and used in an adsorption vessel for water purification.

Exemplary Embodiment 4

Adsorber granules synthesized according to Examples 1–3, typically between 0.5 and 2 mm or in comminuted form are incorporated into a contact space. The filtration unit has a flow rate for air as fluid of 2,000 ml per minute at a pressure difference of 0.1 bar.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Process for producing highly reactive reagents for purifying water or gas which is polluted by organic, inorganic or biological pollutants or constituents, comprising providing mixtures of various adsorber media, whose adsorption properties supplement one another in the mixtures characterized in that the mixtures of various adsorber mixture comprises as a main component a member selected from the group consisting of:

(a) finely divided iron oxide and/or iron oxyhydroxide, the finely divided iron oxide and/or iron oxyhydroxide having a BET surface area of 50 to 500 m$^2$/g, and optionally agglomerates thereof comprising iron oxide pigments having particle sizes above sizes of the finely divided iron oxide and/or iron oxyhdrooxide and BET surface areas below the surface area of the iron oxide and/or iron oxyhydroxide, wherein the adsorber mixture content is sufficient to provide effective strength of packing with respect to forces of flowing medium acting on it to be high enough that loading of the packing by flowing medium does not lead to an unwanted abrasion of packing materials;

(b) manganese oxide and/or titanium oxides or (oxy) hydroxides, $Fe(OH)_3$, or their aging products and dehydrogenated secondary products;

(c) lime, iron exchanger, catalysts, and (d) copper compounds and/or zinc compounds and/or silver compounds whereby the main component is admixed with an aqueous suspension of iron oxide and/or iron oxyhydroxide, wherein the suspension, optionally after predrying, is subjected in the semisolid state to a mechanical shaping and subsequent drying, to achieve a solid state.

2. Process according to claim 1, characterized in that the adsorber media are ground and used as powder.

3. Process according to claim 1, characterized in that the adsorber media are used as granules.

4. Process according to claim 1, characterized in that the adsorber media are pressed to form a single block.

5. Process according to claim 1, characterized in that the adsorber media are processed to form granules.

6. Process according to claim 1, characterized in that the mixtures are additionally admixed with additives.

7. Process according to claim 6, characterized in that the additives used are clay flour, fired clay, bentonites, thixotropic bentonites, gas concrete dust, perlites, expanded clay, sandy limestone flour, trass flour, limestone flour, trass lime, bleaching earth, cement, calcium aluminate, sodium aluminate, calcium sulphide, organic sulphides, calcium sulphite, calcium sulphate, water, carbonaceous sorbents, water glass, setting accelerators or setting retardants.

8. Process according to claim 1, characterized in that the mixtures are embedded in a container through which flow can pass.

9. Process according to claim 1, characterized in that the mixtures are embedded in a filter container made of plastic, natural material, ceramic or metal.

10. Process according to claim 1, characterized in that the mixtures are embedded in a cartridge.

11. Process for purifying or treating waters comprising treating the same with the adsorber mixture according to claim 1.

12. Process for gas purification comprising treating the gas with the adsorber mixture comprising various adsorber media, whose adsorption properties supplement one another in the mixture according to claim 1.

13. A process for removing heavy metals and phosphorous compounds, antimony compounds, beryllium compounds, selenium compounds, tellurium compounds and cyano compounds and organic molecules from water comprising treating the water with the adsorber mixture according to claim 1.

14. A process for removing arsenic compounds from water comprising treating the water with the adsorber mixtures according to claim 1.

* * * * *

UNITED STATES PATENT AND TRADEMARK OFFICE
CERTIFICATE OF CORRECTION

PATENT NO. : 6,994,792 B2
DATED : February 7, 2006
INVENTOR(S) : Andreas Schlegel It is certified that error appears in the above-identified patent and that said Letters Patent is hereby corrected as shown below:

Column 11,
Line 4, replace "iron" with -- ion --.

Signed and Sealed this

Eleventh Day of April, 2006

JON W. DUDAS
*Director of the United States Patent and Trademark Office*